United States Patent [19]
Macedone

[11] Patent Number: 6,032,700
[45] Date of Patent: Mar. 7, 2000

[54] HOSE THREADED END PROTECTOR

[76] Inventor: Bennie S. Macedone, 130 Twin Peaks Dr., Walnut Creek, Calif. 94595

[21] Appl. No.: 09/036,416

[22] Filed: Mar. 5, 1998

[51] Int. Cl.[7] ............................... F16L 9/02; B65D 59/06
[52] U.S. Cl. ............................................ 138/110; 138/967
[58] Field of Search ................................. 138/967, 96 R, 138/110; 414/22.51; 285/54; 175/45; 73/49.8

[56] References Cited

U.S. PATENT DOCUMENTS

| 289,381 | 12/1883 | Bodifield et al. | 138/110 |
|---|---|---|---|
| 1,044,013 | 12/1910 | Burnett | 138/110 |
| 1,140,307 | 5/1915 | Hurley | 138/110 |
| 1,249,038 | 1/1917 | Dabney | 138/110 |
| 1,693,459 | 3/1925 | Paulus et al. | 138/110 |
| 1,971,500 | 2/1932 | Palmer | 138/110 |
| 3,810,490 | 5/1974 | Ludwick | 138/110 |

*Primary Examiner*—Andres Kashnikow
*Assistant Examiner*—Davis Hwu

[57] ABSTRACT

A new hose threaded end protector for attaching to a threaded end of a hose to protect the threads from damage, especially when the hose is dropped. The inventive device includes a coiled portion having a pair of opposite proximal and distal ends and a plurality of loops. An attachment portion is coupled to the proximal end of the coiled portion. The attachment portion is adapted for attachment to a portion of a hose.

8 Claims, 2 Drawing Sheets

HOSE THREADED END PROTECTOR

BACKGROUND OF THE INVENTION

1. Field of the Invention

The present invention relates to devices for protecting hoses from damage and more particularly pertains to a new hose threaded end protector for attaching to a threaded end of a hose to protect the threads from damage, especially when the hose is dropped.

2. Description of the Prior Art

The use of devices for protecting hoses from damage is known in the prior art. More specifically, devices for protecting hoses from damage heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for protecting hoses from damage include U.S. Pat. No. 4,733,888; U.S. Pat. No. 4,614,207; U.S. Pat. No. 4,228,823; U.S. Pat. No. 4,146,058; U.S. Pat. No. 4,005,735; and U.S. Pat. No. Des. 356,146.

While these devices fulfill their respective, particular objectives and requirements, the aforementioned patents do not disclose a new hose threaded end protector. The inventive device includes a coiled portion having a pair of opposite proximal and distal ends and a plurality of loops. An attachment portion is coupled to the proximal end of the coiled portion. The attachment portion is adapted for attachment to a portion of a hose.

In these respects, the hose threaded end protector according to the present invention substantially departs from the conventional concepts and designs of the prior art, and in so doing provides an apparatus primarily developed for the purpose of attaching to a threaded end of a hose to protect the threads from damage, especially when the hose is dropped.

SUMMARY OF THE INVENTION

In view of the foregoing disadvantages inherent in the known types of devices for protecting hoses from damage now present in the prior art, the present invention provides a new hose threaded end protector construction wherein the same can be utilized for attaching to a threaded end of a hose to protect the threads from damage, especially when the hose is dropped.

The general purpose of the present invention, which will be described subsequently in greater detail, is to provide a new hose threaded end protector apparatus and method which has many of the advantages of the devices for protecting hoses from damage mentioned heretofore and many novel features that result in a new hose threaded end protector which is not anticipated, rendered obvious, suggested, or even implied by any of the prior art devices for protecting hoses from damage, either alone or in any combination thereof.

To attain this, the present invention generally comprises a coiled portion having a pair of opposite proximal and distal ends and a plurality of loops. An attachment portion is coupled to the proximal end of the coiled portion. The attachment portion is adapted for attachment to a portion of a hose.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hose threaded end protector apparatus and method which has many of the advantages of the devices for protecting hoses from damage mentioned heretofore and many novel features that result in a new hose threaded end protector which is not anticipated, rendered obvious, suggested, or even implied by any of the prior art devices for protecting hoses from damage, either alone or in any combination thereof.

It is another object of the present invention to provide a new hose threaded end protector which may be easily and efficiently manufactured and marketed.

It is a further object of the present invention to provide a new hose threaded end protector which is of a durable and reliable construction.

An even further object of the present invention is to provide a new hose threaded end protector which is susceptible of a low cost of manufacture with regard to both materials and labor, and which accordingly is then susceptible of low prices of sale to the consuming public, thereby making such hose threaded end protector economically available to the buying public.

Still yet another object of the present invention is to provide a new hose threaded end protector which provides in the apparatuses and methods of the prior art some of the advantages thereof, while simultaneously overcoming some of the disadvantages normally associated therewith.

Still another object of the present invention is to provide a new hose threaded end protector for attaching to a threaded end of a hose to protect the threads from damage, especially when the hose is dropped.

Yet another object of the present invention is to provide a new hose threaded end protector which includes a coiled portion having a pair of opposite proximal and distal ends and a plurality of loops. An attachment portion is coupled to the proximal end of the coiled portion. The attachment portion is adapted for attachment to a portion of a hose.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
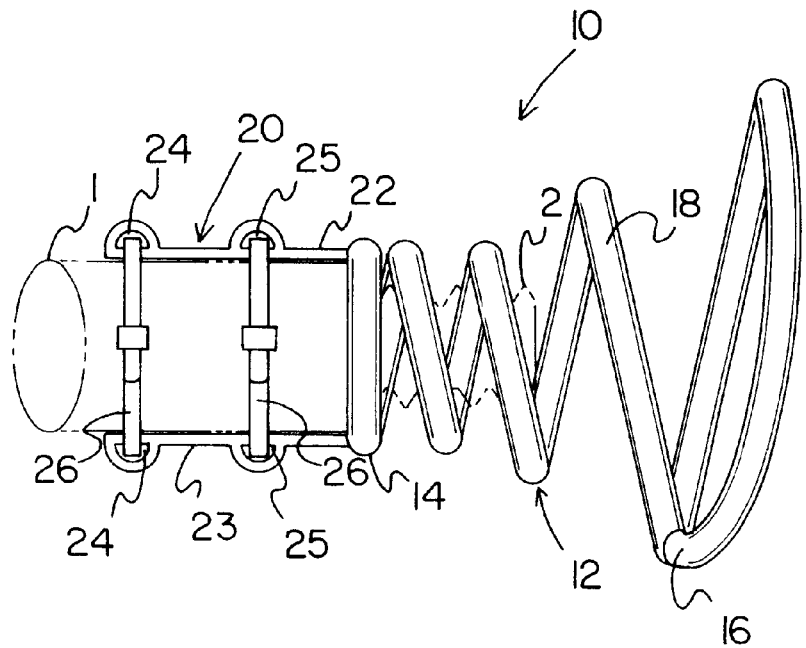
FIG. 1 is a schematic side view of a new hose threaded end protector according to the present invention.
Figure 2:
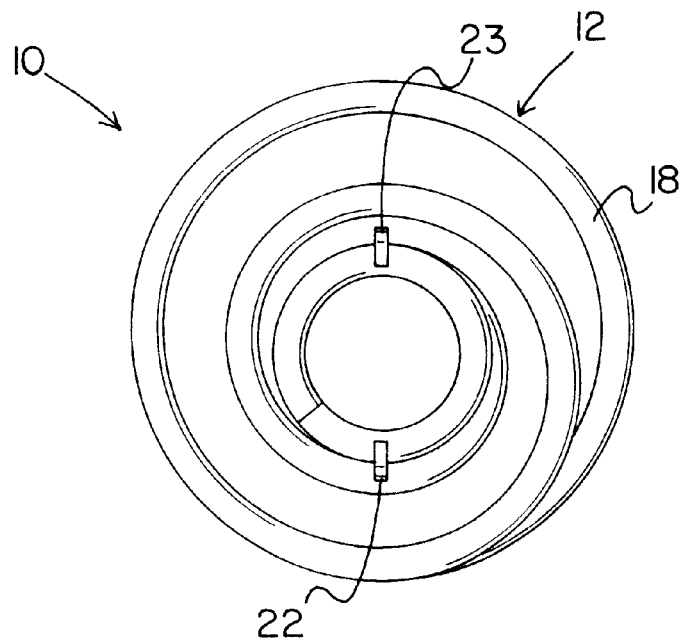
FIG. 2 is a schematic distal side view of the present invention.
Figure 3:
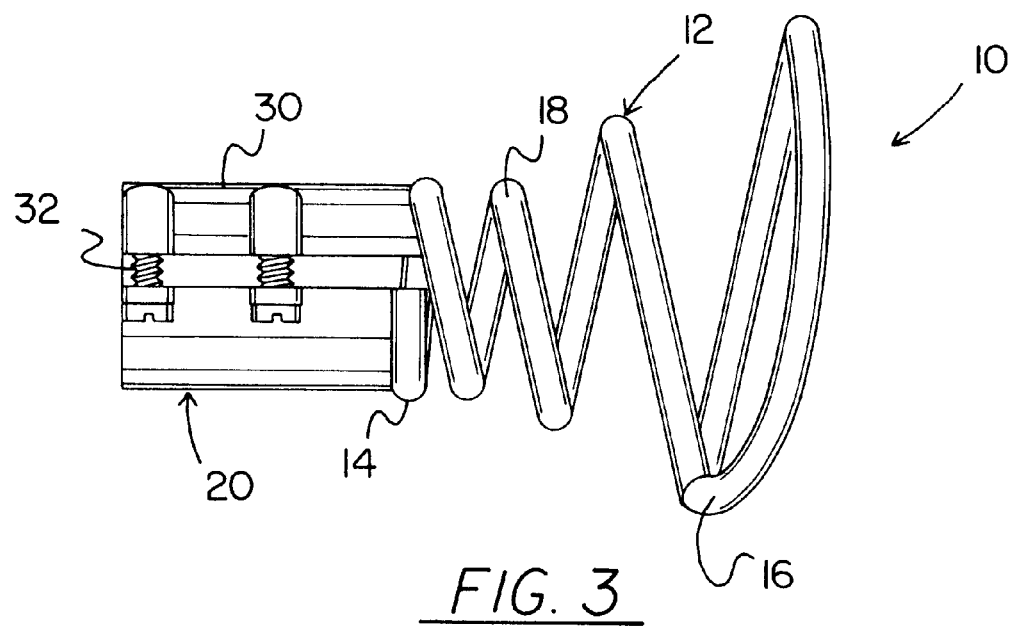
FIG. 3 is a schematic side view of the sleeve embodiment attachment member of the present invention.
Figure 4:
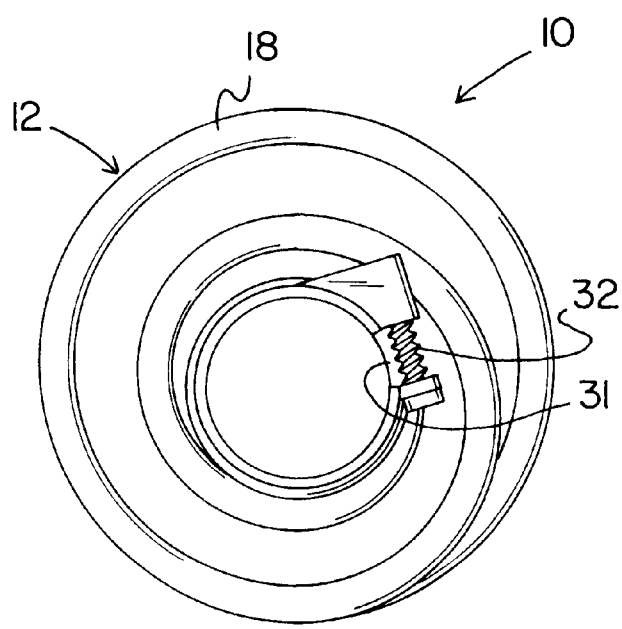
FIG. 4 is a schematic distal side view of the sleeve embodiment attachment member of the present invention.

With reference now to the drawings, and in particular to FIGS. 1 through 4 thereof, a new hose threaded end protector embodying the principles and concepts of the present invention and generally designated by the reference numeral 10 will be described.

The protector is designed for attachment to a hose 1 for protecting a free threaded end 2 of a hose. As best illustrated in FIGS. 1 through 4, the hose threaded end protector 10 generally comprises a coiled portion 12 having a pair of opposite proximal and distal ends 14,16 and a plurality of loops. An attachment portion 20 is coupled to the proximal end 14 of the coiled portion 12. The attachment portion 20 is adapted for attachment to a portion of a hose 1.

In use, the protector is designed for attaching to a threaded end 2 of a hose 1 to protect the threads from damage, especially when the hose 1 is dropped on a ground surface. In closer detail, the coiled portion 12 has a pair of opposite proximal and distal ends 14,16 with a plurality of generally circular loops 18 therebetween. Preferably, the loops 18 are concentrically arranged in a spiral that tapers from the distal end 16 towards the proximal end 14 of the coiled portion 12 such that the loops 18 of the coiled portion 12 have a continually decreasing radius from the distal end 16 of the coiled portion 12 towards the proximal end 14 of the coiled portion 12. The loops 18 define a central space for positioning the threaded end 2 of a hose 1 therein for protecting the threaded end 2. The coiled portion 12 protects the end of the hose because it is resilient when it is deflected such as when it hits or is dropped on to a ground surface. Preferably, the distal end of the coiled portion 12 is coupled to a portion of an adjacent loop of the plurality of loops to prevent it from accidentally catching on items.

The attachment portion 20 is coupled to the proximal end 14 of the coiled portion 12 and is adapted for attachment to a portion of a hose 1 preferably adjacent the threaded end 2 of the hose 1. In one preferred embodiment (FIGS. 1 and 2), the attachment portion 20 comprises a plurality of spaced apart arms 22,23 preferably diametrically extended from the proximal end 14 of the coiled portion 12 and generally parallel to the axis of the loops 18. The arms 22,23 are designed for positioning adjacent a portion of a hose 1. Each arm 22,23 has a plurality of holes 24,25 for extending fasteners therethrough to secure the arms 22,23 to a hose 1. Each hole of one of the arms 22,23 is associated with a hole of another of the arms 22,23. Ideally, each pair of associated holes of the arms 22,23 has an attachment band 26, such as an electrical tie, extending therethrough. The attachment bands 26 are designed for securing the arms 22,23 to the hose 1.

In another preferred embodiment (FIGS. 3 and 4), the attachment portion 20 comprises a tubular sleeve 30 having a longitudinal break 31 therethrough which defines a pair of edges. The sleeve 30 is designed for disposing around a hose 1. Preferably, a pair of threaded fasteners 32 adjustably fasten the edges of the sleeve 30 together to secure the sleeve 30 to the hose 1.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An attachment for protecting a free threaded end of a hose, said attachment comprising:

a coiled portion having a pair of opposite proximal and distal ends and a plurality of loops each of said loops having a radius;

an attachment portion being coupled to said proximal end of said coiled portion, said attachment portion being adapted for attachment to a portion of a hose;

wherein said attachment portion comprises a plurality of spaced apart arms being extended from said proximal end of said coiled portion, each of said arms having a plurality of holes for extending fasteners therethrough to secure said arms to a hose, each hole of one of said arms being associated with a hole of another of said arms.

2. The attachment of claim 1, said loops are concentrically arranged in a spiral, each of said loops having a radius, said spiral of said loops being tapered from said distal end towards said proximal end of said coiled portion such that each said loop has a radius greater than the adjacent loop located on the proximal side of said loop and a radius less than the adjacent loop located on the distal side of said loop.

3. The attachment of claim 1, wherein said distal end of said coiled portion is coupled to a portion of an adjacent loop of said plurality of loops.

4. The attachment of claim 1, wherein each pair of associated holes of said arms has an attachment band extending therethrough.

5. The attachment of claim 1, wherein each pair of associated holes of said arms has an attachment band extending therethrough.

6. An attachment for protecting a free threaded end of a hose, said attachment comprising:

a coiled portion having a pair of opposite proximal and distal ends and a plurality of loops being concentrically arranged in a spiral, each of said loops having a radius, said spiral of said loops being tapered from said distal end towards said proximal end of said coiled portion such that each said loop has a radius greater than the adjacent loop located on the proximal side of said loop and a radius less than the adjacent loop located on the distal side of said loop;

wherein said distal end of said coiled portion is coupled to a portion of an adjacent loop of said plurality of loops;

an attachment portion being coupled to said proximal end of said coiled portion, said attachment portion being adapted for attachment to a portion of a hose; and wherein said attachment portion comprises a plurality of spaced apart arms being extended from said proximal end of said coiled portion, each of said arms having a plurality of holes for extending fasteners therethrough to secure said arms to a hose, each hole of one of said arms being associated with a hole of another of said arms, wherein each pair of associated holes of said arms has an attachment band extending therethrough.

7. An attachment for protecting a free threaded end of a hose, said attachment comprising:

a coiled portion having a pair of opposite proximal and distal ends and a plurality of loops each of said loops having a radius, said distal end of said coiled portion being coupled to a portion of an adjacent loop of said plurality of loops;

an attachment portion being coupled to said proximal end of said coiled portion, said attachment portion being adapted for attachment to a portion of a hose; and wherein said attachment portion comprises a tubular sleeve having a longitudinal break therethrough defining a pair of edges, wherein a pair of threaded fasteners adjustably fasten said edges of said sleeve together for securing said sleeve to a hose.

8. The attachment of claim 7, said loops are concentrically arranged in a spiral, each of said loops having a radius, said spiral of said loops being tapered from said distal end towards said proximal end of said coiled portion such that each said loop has a radius greater than the adjacent loop located on the proximal side of said loop and a radius less than the adjacent loop located on the distal side of said loop.

* * * * *